(12) United States Patent
Drane et al.

(10) Patent No.: US 7,728,226 B2
(45) Date of Patent: *Jun. 1, 2010

(54) UNIVERSAL WATER-RESISTANT COVER ASSEMBLY FOR AN ELECTRICAL OUTLET BOX

(75) Inventors: Mark R. Drane, Germantown, TN (US); Joey Magno, Jr., Cordova, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 328 days.

This patent is subject to a terminal disclaimer.

(21) Appl. No.: 11/895,690

(22) Filed: Aug. 27, 2007

(65) Prior Publication Data

US 2008/0179073 A1    Jul. 31, 2008

Related U.S. Application Data (60) Provisional application No. 60/898,062, filed on Jan. 29, 2007.

(51) Int. Cl.
    *H02G 3/14* (2006.01)
(52) U.S. Cl. .......................... 174/66; 174/67; 220/241; 220/242; 439/536
(58) Field of Classification Search .................. 174/480, 174/481, 50, 53, 57, 58, 66, 67, 485; 220/3.2–3.9, 220/4.02, 241, 242; 439/535, 536; 248/906
See application file for complete search history.

(56) References Cited

U.S. PATENT DOCUMENTS

| | | | |
|---|---|---|---|
| 3,137,407 A | 6/1964 | Mackiewicz | |
| 3,619,477 A | 11/1971 | Rasmussen | |
| 4,102,466 A | 7/1978 | Jadatz | |
| 4,134,516 A | 1/1979 | Sullo | |
| 4,228,317 A | 10/1980 | Cziment | |
| 4,265,365 A | 5/1981 | Boteler | |
| 4,381,063 A | 4/1983 | Leong | |
| 4,424,407 A | 1/1984 | Barbic | |
| 4,505,403 A | 3/1985 | Bowden, Jr. et al. | |
| 4,654,470 A | 3/1987 | Feldman et al. | |
| 4,673,097 A | 6/1987 | Schuldt | |
| 4,724,281 A | 2/1988 | Nix et al. | |
| 4,874,906 A | 10/1989 | Shotey | |
| 4,979,634 A | 12/1990 | Begley | |
| 4,988,832 A | 1/1991 | Shotey | |
| 5,171,939 A | 12/1992 | Shotey | |
| 5,245,507 A | 9/1993 | Ericksen | |
| 5,280,135 A | 1/1994 | Berlin et al. | |

(Continued)

*Primary Examiner*—Angel R Estrada
(74) *Attorney, Agent, or Firm*—Hoffman & Baron, LLP (57) ABSTRACT

A water-resistant cover assembly for an electrical outlet box includes a gasket sized to substantially cover the open side of the electrical outlet box, an adapter plate and a cover adapted to engage the mounting screw of the electrical fixture for mounting the cover to the outlet box. The adapter plate has an opening sized and shaped to receive a portion of the electrical fixture therein, and further includes a projection extending from a back face thereof. The projection pierces through the gasket to be frictionally held thereto and has a size adapted to be received in the aperture of the electrical fixture for aligning the adapter plate and the gasket thereto. The cover has an opening for providing access to the electrical fixture and is adapted to sandwich the adapter plate and the gasket against the electrical fixture when mounted to the outlet box.

25 Claims, 9 Drawing Sheets

U.S. PATENT DOCUMENTS

| | | |
|---|---|---|
| 5,317,108 A | 5/1994 | Prairie, Jr. |
| 5,387,761 A | 2/1995 | Simonis |
| 5,621,192 A | 4/1997 | Bordwell et al. |
| 5,763,831 A | 6/1998 | Shotey et al. |
| 6,133,531 A | 10/2000 | Hayduke et al. |
| 6,179,634 B1 * | 1/2001 | Hull et al. .................. 174/485 |
| 6,441,307 B1 | 8/2002 | Shotey et al. |
| 6,476,321 B1 | 11/2002 | Shotey et al. |
| 6,519,208 B2 | 2/2003 | DeVries |
| 6,583,358 B1 | 6/2003 | Shotey et al. |
| 6,642,453 B2 | 11/2003 | Shotey et al. |
| 6,674,031 B1 * | 1/2004 | Flegel ........................ 174/53 |
| 6,723,922 B1 | 4/2004 | Shotey et al. |
| 6,770,814 B2 | 8/2004 | Shotey et al. |
| 6,770,816 B2 | 8/2004 | Shotey |
| 6,835,890 B2 * | 12/2004 | Dinh et al. .................... 174/66 |
| 6,843,669 B2 * | 1/2005 | Drane et al. ................ 174/480 |
| 6,872,887 B2 | 3/2005 | Shotey |
| 6,891,104 B2 | 5/2005 | Dinh |
| 6,894,223 B1 | 5/2005 | Shotey et al. |
| 6,930,251 B2 | 8/2005 | Shotey et al. |
| 6,956,169 B1 | 10/2005 | Shotey et al. |
| 6,956,171 B1 | 10/2005 | Gretz |
| 6,960,721 B2 | 11/2005 | Shotey |
| 6,965,078 B1 | 11/2005 | Gretz |
| 6,987,225 B2 | 1/2006 | Shotey et al. |
| 7,005,578 B2 | 2/2006 | Gretz |
| 7,064,271 B2 | 6/2006 | Gretz |
| 7,071,415 B1 | 7/2006 | Shotey et al. |
| 7,105,745 B2 * | 9/2006 | Drane et al. .................. 174/67 |
| 7,115,820 B1 | 10/2006 | Gretz |
| 7,119,277 B1 | 10/2006 | Shotey et al. |
| 7,151,219 B1 | 12/2006 | Gretz |
| 7,166,801 B1 | 1/2007 | Gretz |
| 7,176,379 B2 | 2/2007 | Shotey et al. |
| 7,227,079 B2 * | 6/2007 | Noest et al. .................... 174/50 |
| 7,265,292 B2 * | 9/2007 | Greenfield .................... 174/67 |
| 7,282,643 B2 | 10/2007 | Maltby et al. |

* cited by examiner

UNIVERSAL WATER-RESISTANT COVER ASSEMBLY FOR AN ELECTRICAL OUTLET BOX

CROSS-REFERENCE TO RELATED APPLICATIONS

This application claims the benefit of U.S. Provisional Application No. 60/898,062, filed on Jan. 29, 2007.

FIELD OF THE INVENTION

The present invention relates to electrical outlet boxes, and more particularly to a universal electrical outlet box cover which accommodates multiple types of electrical devices, such as duplex receptacles, GFCI receptacles, various switch designs and different sizes of round receptacles.

BACKGROUND OF THE INVENTION

It has long been known to house electrical fixtures such as switches and receptacles in an electrical outlet box. The outlet box permits the insertion of electrical wires into the box which are terminated to electrical fixtures. The fixtures then may be mounted to the box which provides protection to the fixtures as well as the wires terminated therein. The outlet box is mounted to a wall or other structure at a convenient location to provide access. A face plate or cover is then mounted over the fixture to close off the box, yet maintain the required access to the fixture.

Electrical fixtures for mounting in a standard size outlet box are available in a variety of configurations. Such fixtures include single and duplex receptacles in varying shapes, GFCI receptacles, round receptacles, and various types of switches, including toggle and rocker plates. The selection of the type of fixture to mount within the box is dependant upon the specifics of the application and the desired aesthetic result.

While the outlet box itself is generally universal to the type of fixture mounted therein, a face plate or cover must be selected for each type of particular fixture mounted in the box. For example, a face plate adapted for a duplex receptacle fixture will have two access openings sized and shaped to match the size and shape of the two receptacles of the fixture, whereas a face plate adapted for mounting with a simple single toggle switch will have a single opening having a size and shape matching the toggle switch.

As can be appreciated, the varying shapes and sizes of the access openings prevent the face plates or covers from being interchangeable. As a result, an electrician at a construction worksite would necessarily need to have in his or her possession a collection of various face plates or covers to accommodate all of the possible fixtures. As the face plates or covers are generally well constructed so as to provide suitable protection to the interior of an electrical box, the cost of maintaining a large inventory of such face plates or covers becomes a drawback.

Alternatively, face plate or cover assemblies can be employed that are adaptable or convertible to accommodate multiple styles of electrical fixtures. These cover assemblies generally include a number of adapter plates to accommodate the different types of electrical fixtures. With these cover assemblies, the appropriate adapter plate is selected, depending on the type of electrical fixture, and the selected plate is mechanically mounted to the back of the cover. The cover is then mounted to the electrical box.

One drawback with such conventional cover assemblies is the difficulty involved in aligning the cover, with the adapter plate mounted thereto, to the electrical fixture contained within the box. Often, several adjustments must be made between the adapter plate and the cover so that the adapter plate, cover, electrical fixture and outlet box can be properly aligned for mounting. To make matters worse, in certain installations as discussed below, a loose gasket must be accurately positioned and held between the cover and outlet box during mounting of the cover to the box.

Another consideration is the fact that such outlet boxes having electrical fixtures mounted therein are often installed outdoors or in other places where they may be subject to adverse conditions. In such environments it is necessary to construct the outlet box to be water resistant, so as to protect the components housed therein. Undesirable accumulation of water within the box can be dangerous and detrimental to such electrical fixtures housed therein. Various electrical codes and standards such as those promulgated by Underwriters Laboratories (UL) require exterior outlet boxes to have a certain degree of water resistance, i.e., resistance to entry of water over a period of time.

The art has seen a wide variety of box constructions which are designed to prevent the accumulation of water within the box. Typically, a cover is provided having a hinged lid, which provides access to the fixture when open and seals the box from the exterior when closed. Many of these covers also employ some form of gasket, as mentioned above, interposed between the box and the cover and another form of seal interposed between the hinged lid and the cover so as to prevent water from entering the interior of the box.

To ensure water resistance, the cover must be fitted to the electrical fixture contained within the outlet box. In particular, each type of electrical fixture requires a different sized and shaped access opening in the cover so that a sufficient water tight seal can be established between the cover and the fixture. Thus, manufacturers typically provide a series of box covers having differently sized access openings.

Additionally, the cover must be configured for horizontal or vertical installation. In this regard, manufacturers also typically provide a vertically oriented series of box covers and a horizontally oriented series of box covers. The vertically oriented series of covers include a rectangular base plate having a hinge on the short side with a lid pivotally attached to the hinge for vertical installations. The horizontal series of covers include a hinge on the long side of the base plate for horizontal installations. At times, installers will mount a vertical series box horizontally (or vice versus), but such installation will not pass UL specifications since such conventional boxes only pass UL specifications in a single orientation.

Obviously, providing a specific horizontal or vertical cover for installation of each type of electrical fixture is inefficient and undesirable in that an electrician would necessarily need to carry many different types of covers to each job site.

Accordingly, it would be desirable to provide a universal cover that is adaptable to a wide variety of electrical fixtures and which is water resistant when mounted in either a vertical or horizontal orientation. It would be further desirable to provide such a cover with means for easy and accurate alignment of all of the cover components during mounting of the cover to an electrical outlet box.

SUMMARY OF THE INVENTION

The present invention is a water-resistant cover assembly for an electrical outlet box having an open side and an electrical fixture contained therein, wherein the electrical fixture includes an aperture and a mounting screw for attaching the fixture to the outlet box. The cover assembly generally includes a gasket sized to substantially cover the open side of the electrical outlet box, an adapter plate and a cover adapted to engage the mounting screw of the electrical fixture for mounting the cover to the outlet box. The adapter plate has an opening sized and shaped to receive a portion of the electrical fixture therein, and further includes a projection extending from a back face thereof. The projection pierces through the gasket to be frictionally held thereto and has a size adapted to be received in the aperture of the electrical fixture for aligning the adapter plate and the gasket thereto. The cover has an opening providing access to the electrical fixture therein and is adapted to sandwich the adapter plate and the gasket against the electrical fixture when mounted to the outlet box. Thus, the adapter plate is not attached to the cover or the electrical fixture.

In a preferred embodiment, the gasket includes a perforation for allowing a portion of the gasket to be removed, thereby forming an opening, wherein the opening is sized and shaped to receive the portion of the electrical fixture therein. The gasket preferably includes two duplex perforations which are sized to form openings to receive two outlets of a duplex receptacle, a centrally disposed rectangular toggle switch perforation which is sized to form an opening to receive a lever of a toggle switch and a circular perforation which is sized to form an opening to receive a circular outlet of a round receptacle. The gasket further preferably includes a projection aperture located to match the location of the adapter plate projection, wherein the projection aperture frictionally engages the adapter plate projection. The gasket further preferably includes a receptacle mounting screw aperture located to match the location of the mounting screw of the electrical fixture, wherein the receptacle mounting screw aperture grips the mounting screw and forms a water-tight seal thereat.

The adapter plate is preferably defined by an outer periphery and the opening in the cover is preferably defined by an inner periphery, wherein the inner periphery of the opening is smaller than the outer periphery of the adapter plate. The adapter plate can include an outwardly extending ear provided on a peripheral edge thereof. In this case, the opening of the cover is defined by an edge perimeter surface which engages the outwardly extending ear to sandwich the adapter plate against the electrical fixture.

The present invention can take the form of a kit for enclosing an electrical outlet box having an open side. The kit generally includes a universal gasket sized to substantially cover the open side of the electrical outlet box, a first adapter plate, a second adapter plate and a cover sized to substantially surround the electrical fixture mounted to the outlet box. The first adapter plate has an outer peripheral edge and two receptacle openings sized and shaped to receive outlets of a duplex receptacle therein. The second adapter plate has an outer peripheral edge and an opening sized and shaped to receive a portion of at least one of a toggle switch and a round receptacle therein. Both adapter plates further include a projection extending from a back face thereof, wherein the projection has a size adapted to pierce through the gasket to be frictionally held thereto and be received in an aperture of the duplex receptacle, the toggle switch or the round receptacle for aligning the adapter plate thereto. The cover has an opening defined by an inner peripheral edge which abuts the outer peripheral edge region of a selected one of the first and second adapter plates to sandwich the selected adapter plate against one of the duplex receptacle, the toggle switch or the round receptacle contained within the electrical outlet box.

The first adapter plate preferably includes a single, centrally disposed projection adapted to be received in a centrally disposed aperture of the duplex receptacle. The second adapter plate preferably includes a centrally disposed rectangular opening formed therein and adapted to receive a toggle member of a toggle switch therethrough. The second adapter plate further preferably includes a first circular, discontinuous slot formed therethrough around the rectangular opening. The first discontinuous slot permits a first circular portion of the adapter plate to be frangibly removed to form a first circular opening in the second adapter plate adapted to receive a circular outlet of a round receptacle. The second adapter plate can further include a second circular, discontinuous slot formed therethrough around the first circular, discontinuous slot if so desired. The second discontinuous slot permits a second circular portion of the adapter plate to be frangibly removed to form a second circular opening in the second adapter plate adapted to receive a circular outlet of a round receptacle. In any case, the second adapter plate preferably includes two projections extending from the back face thereof, wherein the projections are disposed at opposite longitudinal ends of the second adapter plate.

The present invention further involves a method for covering an electrical fixture within an electrical outlet box having the electrical fixture contained therein. The method generally includes the steps of inserting a projection formed on a back face of an adaptor plate through a gasket whereby the adaptor plate is frictionally held to the gasket, aligning the adaptor plate and the gasket to the electrical fixture by inserting the projection in an aperture provided in the electrical fixture and mounting a cover to the outlet box. The adapter plate has an opening adapted to receive a portion of the electrical fixture therethrough and the cover has an opening defined by an inner peripheral edge surface. The inner peripheral edge surface of the cover abuts an outer peripheral edge region of the adapter plate, wherein the adaptor plate and the gasket are sandwiched between the cover and the electrical fixture.

In a preferred embodiment, the method further includes the step of selecting the adapter plate from a plurality of adapter plates based on the type of electrical fixture contained in the electrical outlet box. The method further preferably includes the step of removing a portion of the adapter plate to create the opening to receive the portion of the electrical fixture therein, and further preferably includes the step of removing a portion of the gasket to create an opening to receive the portion of the electrical fixture therein.

A preferred form of the universal cover, as well as other embodiments, objects, features and advantages of this invention, will be apparent from the following detailed description of illustrative embodiments thereof, which is to be read in conjunction with the accompanying drawings.

BRIEF DESCRIPTION OF THE DRAWINGS

FIG. 1b is a back perspective view of the adapter plate shown in FIGS. 1 and 1a.

FIG. 2b is a back perspective view of the adapter plate shown in FIGS. 2 and 2a.

DETAILED DESCRIPTION OF ILLUSTRATIVE EMBODIMENTS

Figure 1:
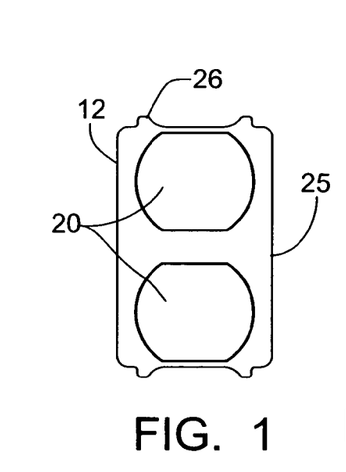
FIG. 1 is a front plan view of a duplex electrical fixture adapter plate used in the cover assembly of the present invention.
Figures 2, 2A:
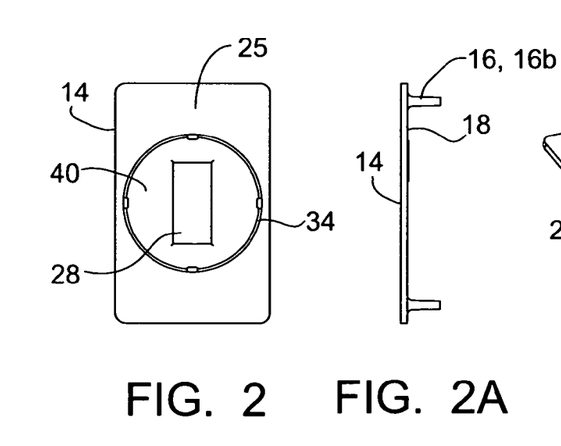
FIG. 2 is a front plan view of a switch/round receptacle adapter plate used in the cover assembly of the present invention.
FIG. 2a is a side view of the adapter plate shown in FIG. 2.

Referring first to FIGS. 1-2, two adapter plates 12, 14 for use with the present invention are shown. For most of the common electrical fixtures used today, only the two adapter plates 12, 14 shown in FIGS. 1-2 are required. Both adapter plates 12, 14 are generally thin planar members and are preferably made from a durable plastic material, such as polyvinylchloride (PVC). Both plates 12, 14 further include at least one prong or projection 16 extending from a back surface 18 thereof. The function of the prong or projection 16 will be described in further detail below.

Figure 1A:
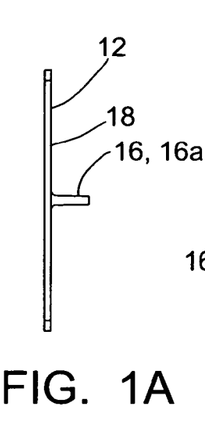
FIG. 1a is a side view of the adapter plate shown in FIG. 1.
Figure 1B:
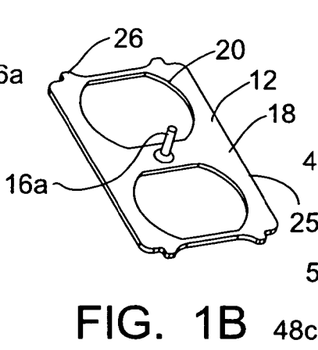
Figure 4:
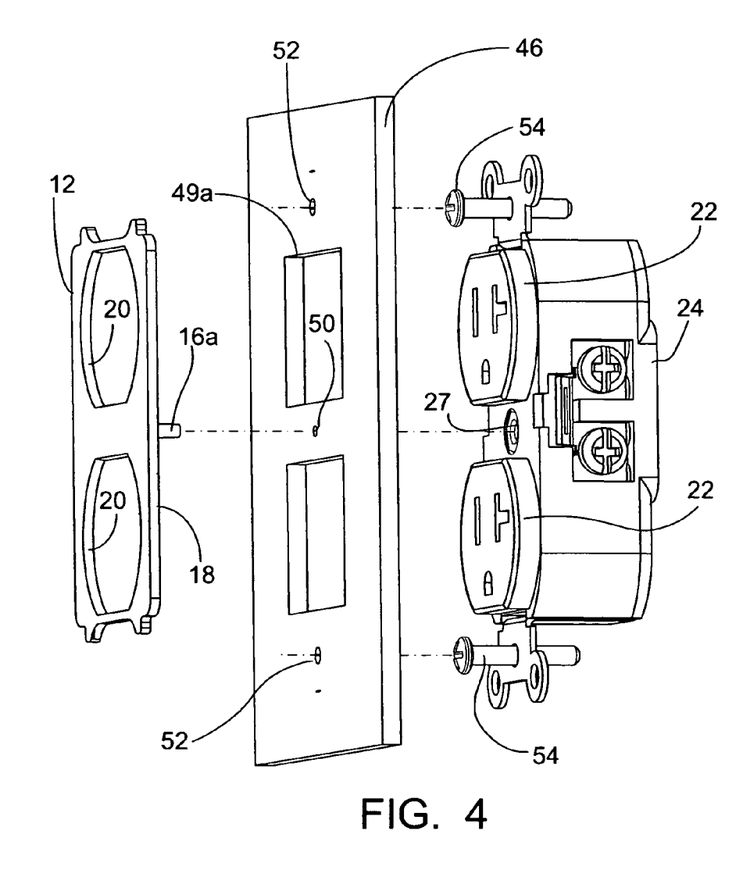
FIG. 4 is an exploded side perspective view of the adapter plate shown in FIGS. 1, 1a and 1b and the gasket shown in FIGS. 3 and 3a being mounted to a duplex receptacle.
Figure 5:
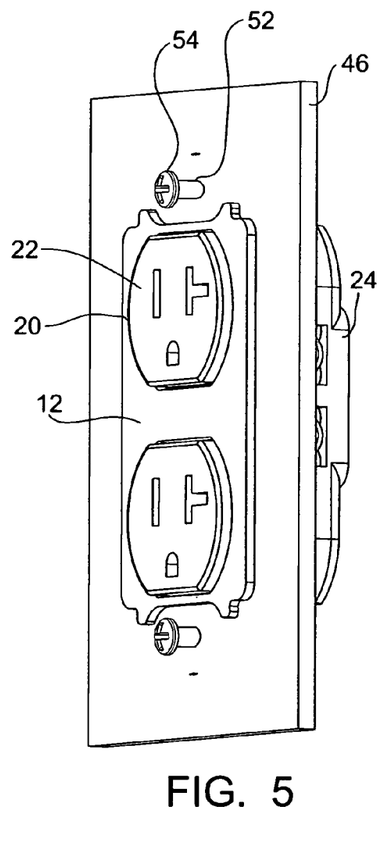
FIG. 5 is a side perspective view of the adapter plate, gasket and duplex receptacle shown in FIG. 4 assembled together.

The adapter plate 12 shown in FIGS. 1, 1a and 1b is in the form of a duplex adapter plate. As such, the plate 12 is formed with two receptacle openings 20, which are sized and shaped to receive the two outlets 22 of a conventional duplex receptacle 24, as shown in FIGS. 4 and 5. The adapter plate 12 may further include one or more outwardly extending ears 26 formed on the periphery thereof to assist in retaining the adapter plate within the cover assembly, as will be discussed in further detail below.

The duplex adapter plate 12 includes a single, centrally disposed projection 16a extending generally perpendicular from the back surface 18 of the plate. The projection 16a of the duplex adapter plate 12 has a diameter which can also be sized to permit the projection to be inserted into a centrally disposed hole 27 formed in the duplex receptacle 24. The diameter of the projection 16a, however, is sufficiently smaller than the diameter of the hole 27 so that the projection will not be attached or secured to the receptacle. Insertion of the projection 16a into the central hole 27 of the duplex receptacle 24 simply aligns the adapter plate 12 with respect to the receptacle and, as will be discussed in further detail below, with respect to the cover of the present invention.

Figure 2B:
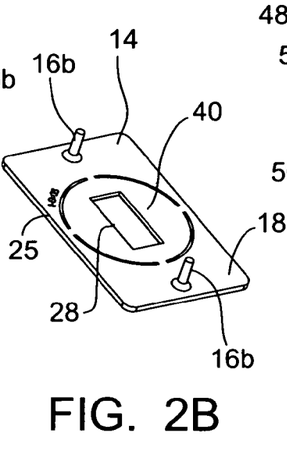

The adapter plate 14 shown in FIGS. 2, 2a and 2b is in the form of a combination toggle switch/round receptacle adapter plate. As mentioned above, for most of the common electrical fixtures used today, only the two adapter plates 12, 14 shown in FIGS. 1 and 2 are required. However, the multiple features of the adapter plate 14 shown in FIGS. 2, 2a and 2b can be divided among multiple adapter plates. For example, an adapter plate adapted solely for a toggle switch can be separately provided in addition to an adapter plate adapted solely for a round receptacle. Moreover, multiple round receptacle adapter plates adapted for different sizes of round receptacles can be provided.

Figure 6:
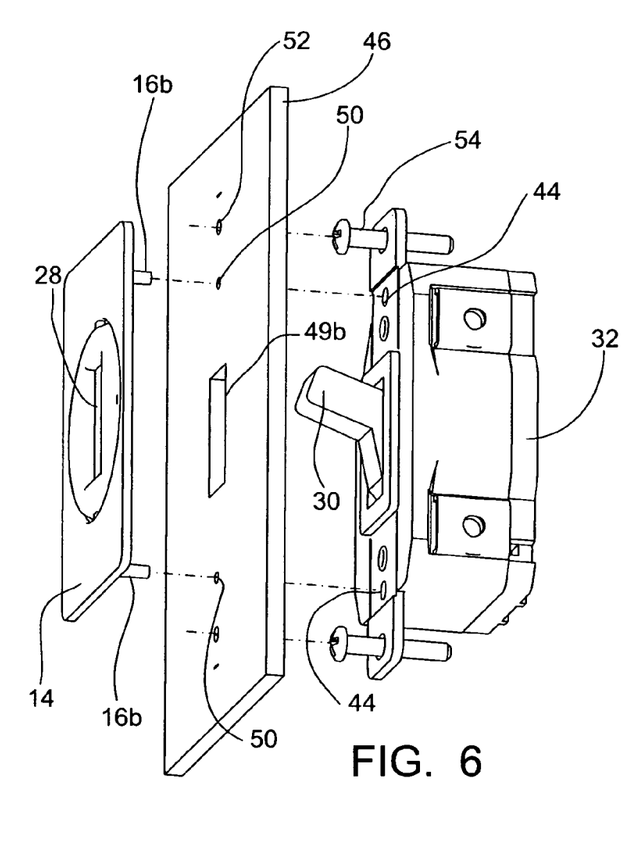
FIG. 6 is an exploded side perspective view of the adapter plate shown in FIGS. 2, 2a and 2b and the gasket shown in FIGS. 3 and 3a being mounted to a toggle switch.
Figure 7:
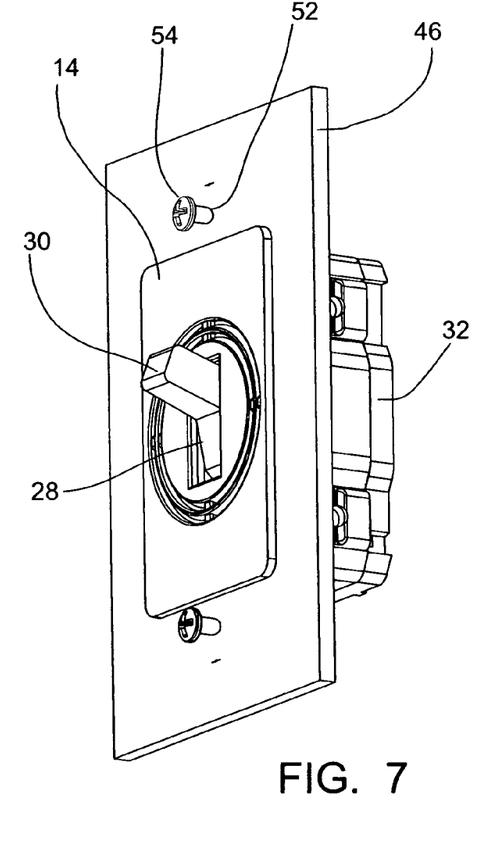
FIG. 7 is a side perspective view of the adapter plate, gasket and toggle switch shown in FIG. 6 assembled together.
Figure 8:
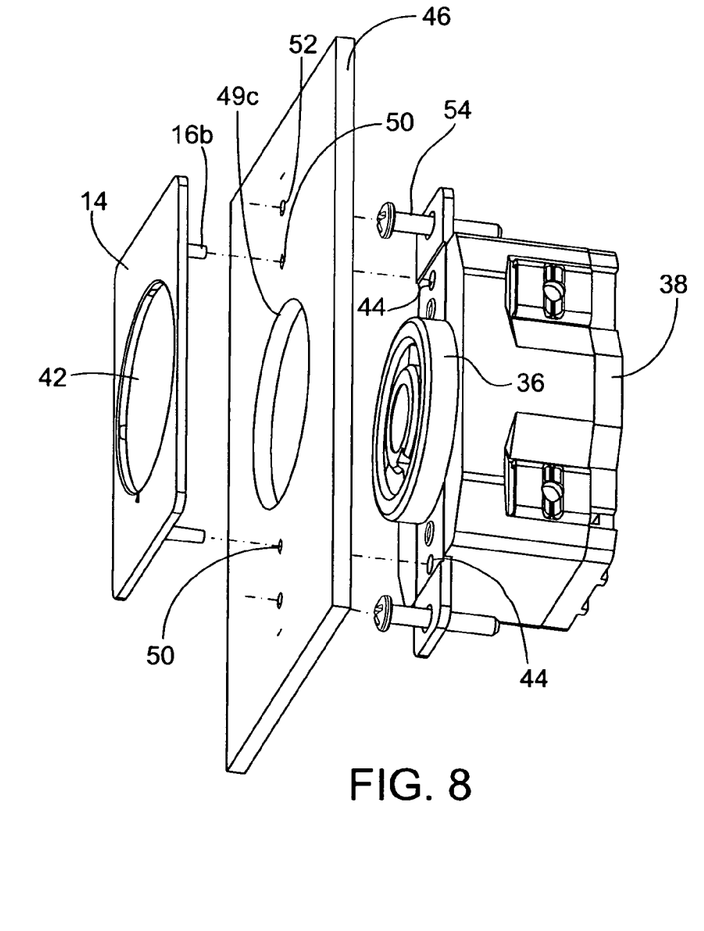
FIG. 8 is an exploded side perspective view of the adapter plate shown in FIGS. 2, 2a and 2b, with center knocked out, and the gasket shown in FIGS. 3 and 3a being mounted to a round receptacle.
Figure 9:
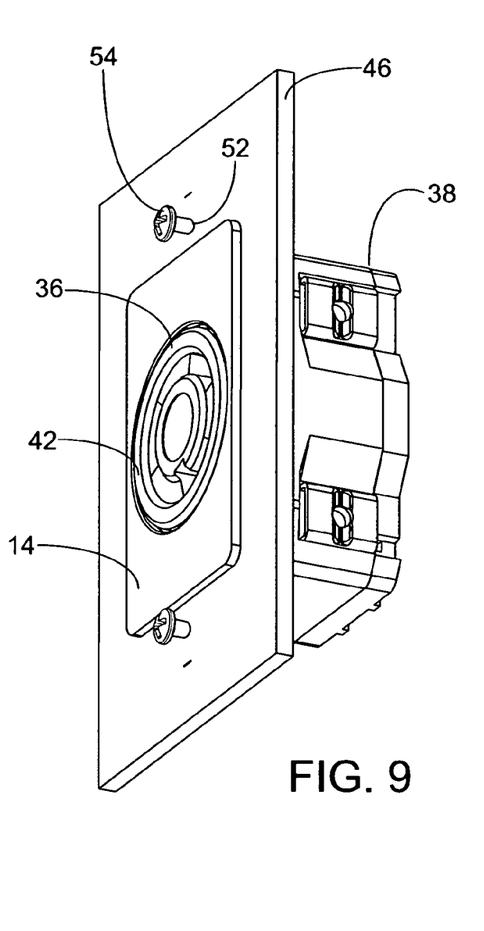
FIG. 9 is a side perspective view of the adapter plate, gasket and round receptacle shown in FIG. 8 assembled together.

In the preferred embodiment, a combined toggle switch/round receptacle adapter plate 14 is provided having a central rectangular toggle switch opening 28 which is sized and shaped to receive the lever 30 of a conventional toggle switch 32, as shown in FIGS. 6 and 7. The toggle switch/round receptacle adapter plate 14 is further formed with one or more circular, discontinuous slots 34 centrally surrounding the toggle switch opening 28. Preferably a plurality of slots 34 are formed through the adapter plate 14, each circular slot having a diameter matching the diameter of an outlet 36 of a conventional round receptacle 38, as shown in FIGS. 8 and 9. The circular discontinuous slots 34 are designed to permit a central portion 40 of the plate 14 to be frangibly removed from the plate to form a circular opening 42, which receives the circular outlet 36 of a round receptacle 38 when the adapter plate is to be used with a round receptacle. Providing a plurality of slots 34 allows different diameter openings 42 to be formed so that the plate can be adapted to round receptacle outlets 36 of different sizes, such as 1 9/16" and 1 3/8" diameters.

The toggle switch/round receptacle adapter plate 14 is formed with two projections 16b longitudinally disposed at opposite ends of the plate. These projections 16b have diameters which are preferably sized to permit the projections to be inserted into opposite longitudinally disposed holes 44 formed in both the toggle switch 32 and the round receptacle 38. Like the duplex adapter plate 12 described above, insertion of the projections 16b into the holes 44 of the toggle switch 32 or the round receptacle 38 aligns the adapter plate 14 with the fixture.

Figure 3:
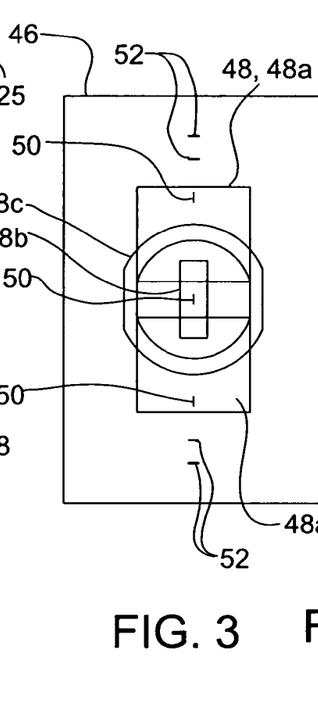
FIG. 3 is a front plan view of the universal gasket used in the cover assembly of the present invention.
Figure 3A:
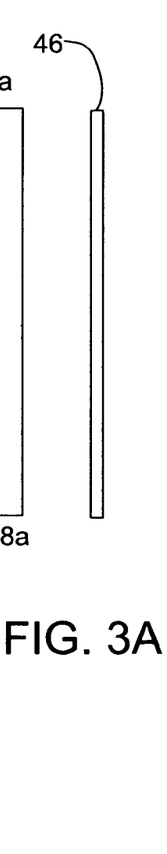
FIG. 3a is a side view of the gasket shown in FIG. 3.

Turning to FIGS. 3 and 3a, the present invention further involves a universal gasket plate 46 made from a thin, resilient, water-resistant sealing material. The gasket 46 is formed with a number of perforations 48 enabling the gasket to be used with either adapter plate 12 or 14 and multiple types of electrical fixtures. In particular, the gasket 46 includes two duplex perforations 48a which are sized to receive the two outlets 22 of a duplex receptacle 24, a centrally disposed rectangular toggle switch perforation 48b which is sized to receive the lever 30 of a toggle switch 32 and one or more circular perforations 48c which are sized to receive the circular outlet 36 of a round receptacle. The perforations 48 enable a portion or portions 49a, 49b, 49c of the gasket 46 to be removed, leaving a desired opening depending on the gasket's use, as shown in FIGS. 6-11.

The gasket 46 is further formed with three projection slits 50, which are located and spaced to match the location and spacing of the projections 16a and 16b provided on the duplex adapter plate 12 and the toggle switch/round receptacle adapter plate 14. Instead of slits 50, holes can be provided in the gasket so long as the holes have a diameter smaller than the diameter of the adapter plate projections 16 so that the projections can be frictionally held within the holes. As will be discussed in further detail below, the projection slits 50 holds and aligns the adapter plate 12 or 14 together with the gasket 46 during installation. Thus, the adapter plate 12 can be attached to and held in place by the gasket 46.

The gasket 46 is further formed with one or more oppositely arranged receptacle mounting screw slits or holes 52. The mounting screw holes 52 are located and spaced to match the location and spacing of the mounting screws 54 of the duplex receptacle 24, the switch 32 or the round receptacle 38. The mounting screw holes 52 are designed to grip the mounting screw bodies and form a water-tight seal therebetween. These mounting screw holes 52 also help to align the gasket 46 to the electrical fixture.

Figures 10, 11:
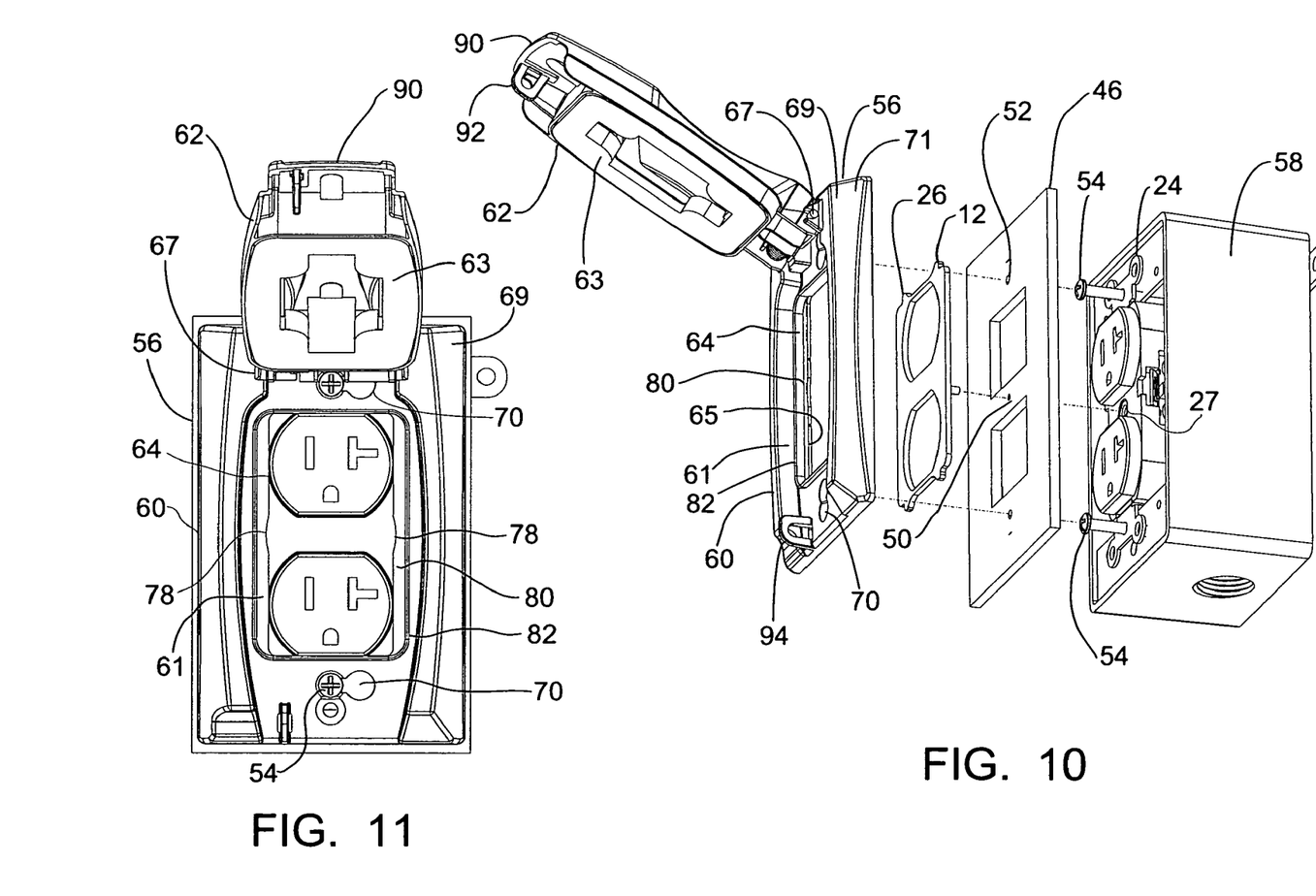
FIG. 10 is an exploded side perspective view of a duplex receptacle contained within an electrical outlet box and a gasket, adapter plate and cover of the present invention being mounted thereto.
FIG. 11 is a front plan view of the components shown in FIG. 10 in an assembled state.

With reference now to FIGS. 10 and 11, the present invention further involves a universal cover 56 which, with the aid of the appropriate adapter plate 12 or 14 and gasket 46, is designed to be mounted to an electrical outlet box 58 regardless of the type of electrical fixture contained therein. The cover 56 includes a rectangular base 60 having a single hinge 67 disposed along one of the edges of the base and a "flip-lid" 62 pivotally attached to the hinge to provide selective access to the outlet box 58.

The lid 62 is preferably seated within a recessed portion 61 of the base 60 defined by a raised ridge 69. The raised ridge 69 surrounds at least three sides of the recessed portion 61 including the edge of the base 60 having the hinge 67. With additional reference to FIG. 14, the ridge 69 is defined by a top wall 81, an outer side wall 71 extending downwardly from the top wall and an inner side wall 73 extending downward from the top wall and spaced from the outer wall. The outer side wall 71 forms an outer periphery of the base 60 and terminates at an end 83 defining an outer peripheral edge of the base. The inner side wall 73 defines the periphery of the recessed portion 61 and includes an opening 64 formed therein to provide access to the electrical fixture mounted within the outlet box 58. The raised ridge 69 functions as a shield to direct rain spray away from the interior of the box 58. As will be discussed in further detail below, the recessed portion 61 allows the cover 56 to be installed in either a vertical or a horizontal orientation.

Figure 14:
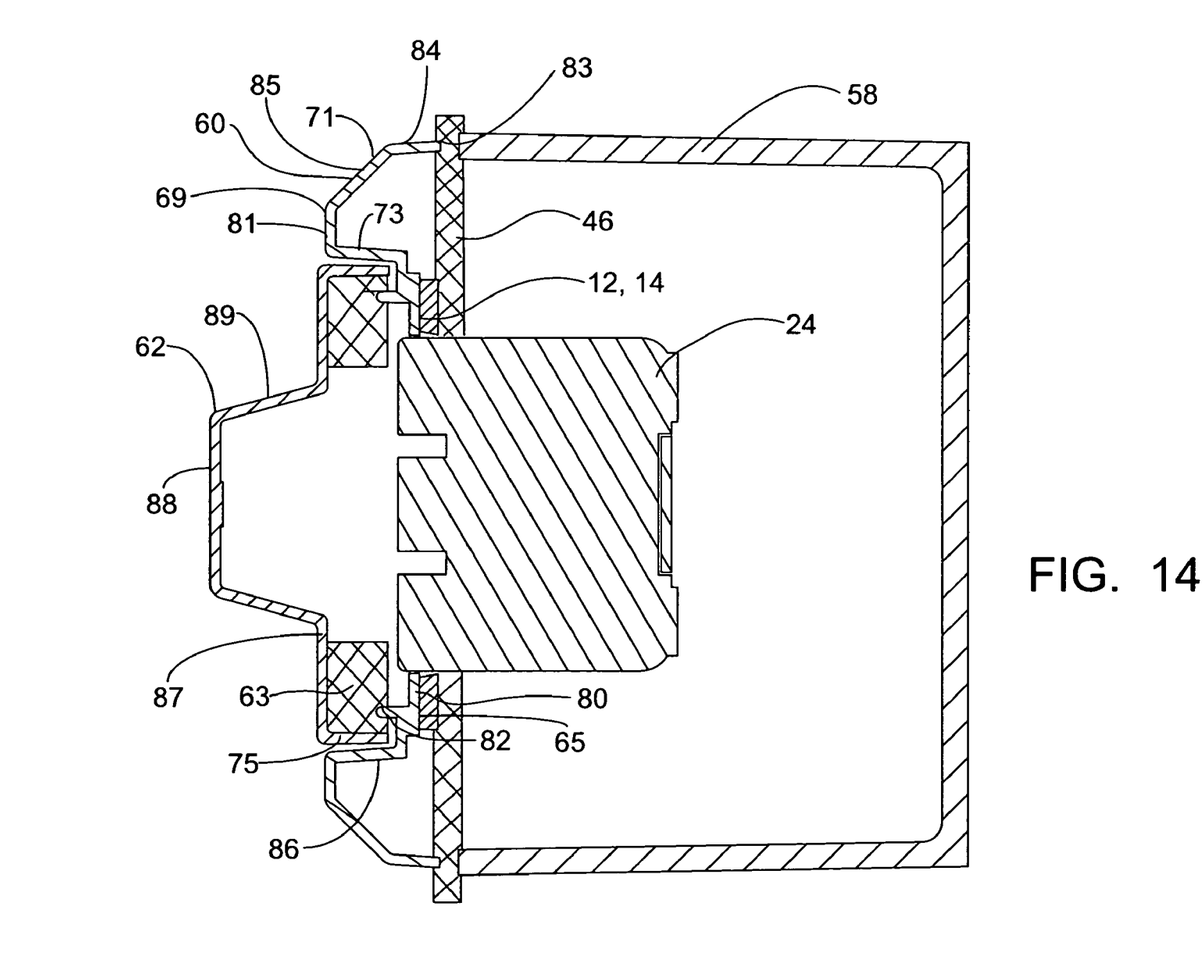
FIG. 14 is a cross-sectional view of the cover assembly shown in FIG. 13 taken along the line 14-14.

The outer side wall 71 of the base ridge 69 preferably includes a straight portion 84 and an angled portion 85 connecting the straight portion to the top wall 81 of the ridge. The straight portion 84 is disposed generally perpendicular to the top wall 81 and the angled portion 85 extends between the straight portion and the top wall at an angle of about forty-five degrees.

The inner side wall 73 of the base ridge 69 preferably includes a straight portion 86 and a flange portion 80. The straight portion 86 extends generally perpendicularly downward from the top wall 81 and the flange portion 80 extends generally perpendicularly from the straight portion and is disposed generally parallel with the top wall. The flange portion 80 includes the base opening 64 formed therein, and further includes an upwardly protruding lip 82 surrounding the opening, the function of which will be discussed shortly.

In a known manner, the lid 62 is preferably spring biased to maintain the lid in a normally closed position within the recessed portion 61 of the base 60 to cover the opening 64. The lid 62 includes a face plate 87 a peripheral side wall 75 extending downwardly from the face plate in a generally perpendicular direction. When the lid 62 is in its closed position, the side wall 75 extends into the recessed portion 61 of the base 60 in a direction generally parallel with the straight portion 86 of the base ridge inner wall 73. Also, the lid 62 further preferably includes a gasket seal 63 retained within the peripheral side wall 75 and facing the base 60 to provide a water-resistant seal against the face of the receptacle, as well as between the lid itself and the base 60. The upwardly protruding lip 82 of the inner side wall flange portion 80 engages the seal 63 in a piercing manner when the lid 62 is closed to enhance the water-resistant seal therebetween.

The upper face plate 87 of the lid 62 can be formed with an upwardly protruding handle portion 88 for facilitating gripping of the lid by hand. In this regard, the handle portion 88 can include indented circular recesses 89 on opposite sides thereof to further facilitate gripping with the fingers of a hand.

Also, the lid 62 can be provided with a handle ledge 90 opposite the hinge 67 as an additional means for gripping and opening the lid. The ledge 90 is further preferably provided with a locking loop or aperture 92, which together with a locking aperture 94 provided on the base 60 allows for locking the lid 62 in a closed position by insertion of a bolt or lock.

Figures 15, 15A, 15B:
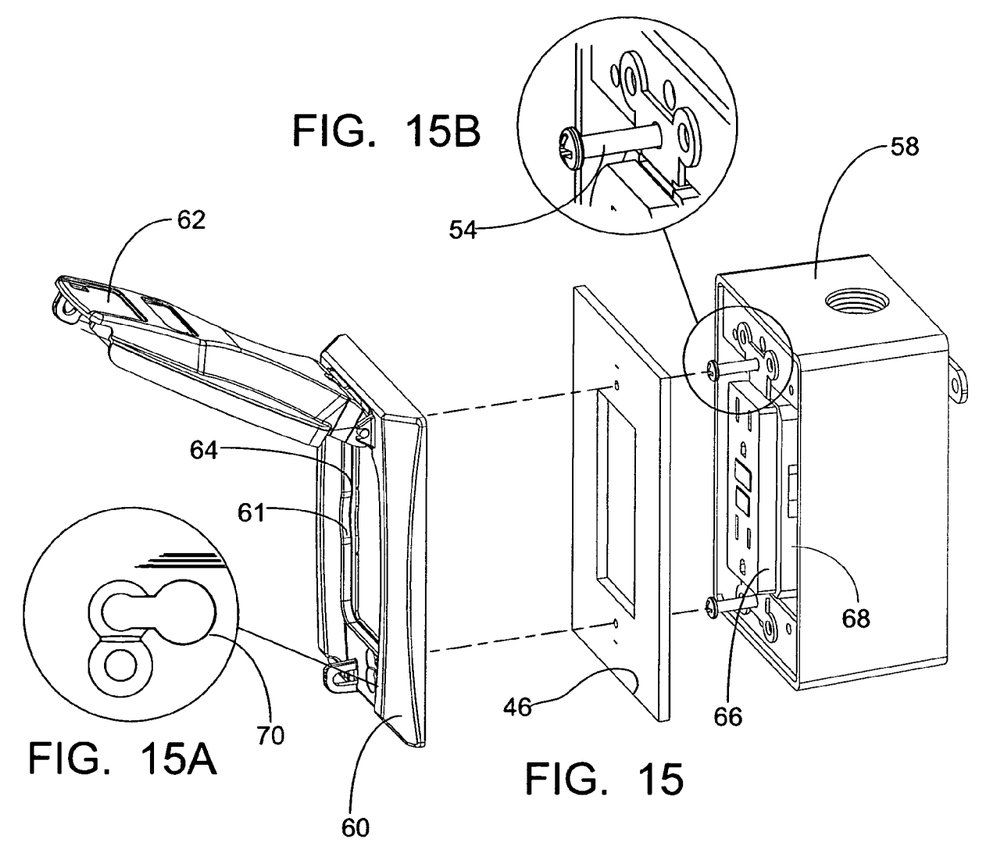
FIG. 15 is a top exploded perspective view of a GFCI receptacle contained within an electrical outlet box and a gasket and cover of the present invention being mounted thereto.
FIG. 15A is an enlarged view of the keyhole opening in the cover shown in FIG. 15.
FIG. 15B is an enlarged view of the mounting screw shown in FIG. 15.

The peripheral edge 83 of the base 60 is sized and shaped to generally match the perimeter of the opening of the electrical outlet box 58 and the opening 64 is centrally formed within the base and is sized to receive the rectangular dual outlet 66 of a conventional GFCI receptacle 68, as shown in FIG. 15, or a conventional non-GFCI decorator-type receptacle (not shown). In general, this would be the largest opening required for most types of conventional electrical fixtures. With these types of fixtures, no adapter plate is required, as the outlet 66 of the receptacle 68 will fit snugly within the opening 64 of the base plate.

The central opening 64 of the base 60 and the outer periphery 25 of the adapter plate 12, 14, are also sized in a cooperating manner which will allow the adapter plate to be retained or "sandwiched" by the base plate upon assembly. Specifically, the flange portion 80 of the base ridge inner wall 73 includes an inner peripheral edge region 65 facing away from the top wall 81. The peripheral edge region 65 surrounds the base opening 64 and is sized so as to engage or abut an outer peripheral surface 25 defining the outer periphery of the adapter plate 12, 14 when the adapter plate and the cover 56 are assembled together. In this manner, the adapter plate 12, 14 butts against the back surface of the base 60 and will therefore be retained or "sandwiched" against the electrical fixture by the base plate. This can be simply accomplished by forming the central opening 64 with a length and width that are respectively slightly smaller than the overall length and width of the adapter plate 12, 14.

However, in a preferred embodiment, the outer peripheral surface 25 of the adapter plate 12, 14 generally matches, or is slightly larger than, the central opening 64 of the base 60, but includes four outwardly extending ears 26 positioned adjacent the corners of the adapter plate, as described above. The ears 26 extend outwardly beyond the inner peripheral edge 65 of the central opening 64 of the base 60 and are therefore engaged by the cover 56 upon assembly.

As mentioned above, the central opening 64 of the base 60 is generally rectangular. However, in a preferred embodiment, the opening 64 further includes two circular indents 78 formed on opposite sides thereof. The indents 78 are provided to accommodate the largest of the circular outlets 36 of known conventional round receptacles 38.

The base 60 is further formed with two or more longitudinally opposite keyholes 70 for engaging the mounting screws 54 of the receptacle 24, 38 or switch 32. The keyholes 70 may be longitudinally oriented, as shown in FIG. 10, or laterally oriented, as shown in FIG. 11. In either case, the keyholes 70 enable the cover 56 to be mounted to the outlet box 58 without having to first remove the mounting screws from the box.

Upon installation, an electrical fixture, such as a duplex receptacle 24 as shown in FIG. 10, is electrically wired and mounted within an electrical outlet box 58 with suitable mounting hardware 54 provided with the electrical fixture. The mounting screws 54 are left untightened or are partially backed-out for reasons that will be described below. The appropriate adapter plate 12 or 14 is then selected for the type of fixture mounted in the box and the appropriate portions 49a, 49b or 49c of the gasket 46 are removed or pierced.

Once the appropriate adapter plate 12 or 14 is selected and the gasket 46 has been adapted to the type of receptacle contained within the outlet box, the one or more projections 16 extending from the back of the adapter plate are inserted into respective slits 50 cut into the gasket 46. The adapter plate 12 or 14, with gasket 46 thus attached, is then aligned with respect to the respective receptacle 24, 38 or switch 32 by inserting the same projection or projections into the alignment hole or holes 27, 44 of the receptacle. During this step, the upper and lower mounting screws 54 can be pushed through the mounting screw holes 52 of the gasket 46.

Alternatively, the installer can fully remove the mounting screws 54 and push only their shaft portions through the holes/slits 52 to prevent any unwanted tearing or stretching of the gasket 46 that might occur when attempting to push the heads through these holes/slits 52. In either case, the cover 56 is then positioned over the outlet box 58 so that the mounting screws 54 are inserted in the widened portion of the keyholes 70. The cover 56 is then laterally or longitudinally moved, depending on the orientation of the keyholes, so that the heads of the mounting screws 54 are retained by the narrower portion of the keyholes 70. The mounting screws 54 are then tightened to mount the cover 56 to the outlet box 58.

Thus, the external cover 56 with flip-lid 62 will sandwich the adapter plate 12, 14 between it and the gasket 46. The outwardly extending ears 26 provided on the adapter plate 12, 14 further assist in sandwiching the plate. Because the adapter plate 12, 14 is not attached or coupled to the external cover 56, the removal of the cover will not remove the adapter plate. Thus, the adapter plate acts more like an "overlay," as opposed to prior art inserts.

Figure 12:
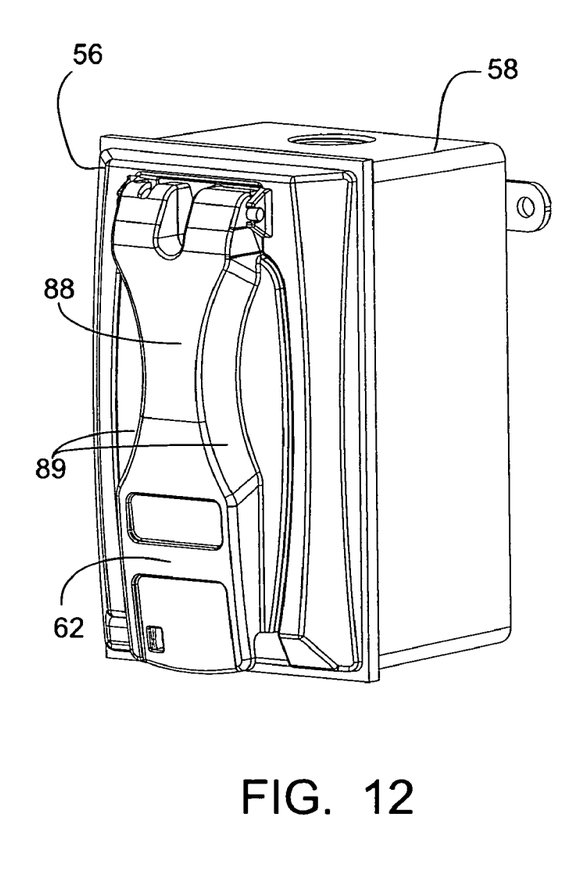
FIG. 12 is a side perspective view of the cover of the present invention mounted to an electrical outlet box in a vertical orientation.
Figure 13:
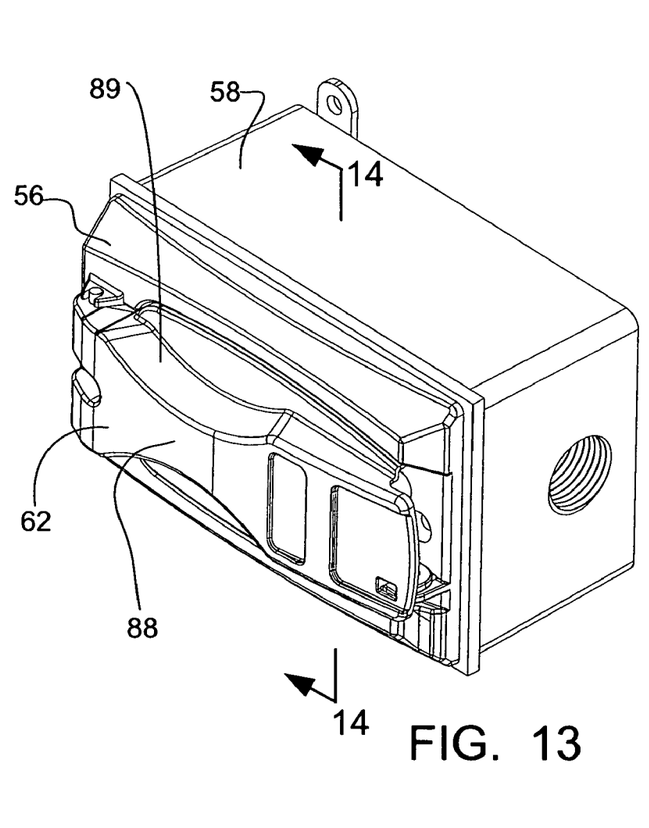
FIG. 13 is a top perspective view of the cover of the present invention mounted to an electrical outlet box in a horizontal orientation.

As shown in FIGS. 12 and 13, the cover 56 can be mounted in either a vertical or horizontal orientation, wherein the cover provides a water resistant seal in either orientation. This is made possible by the recessed portion 61 and the raised ridge 69 provided on the base 60. Specifically, with the peripheral side wall 75 of the lid 62 seated within the recessed portion 61 of the base 60, the raised ridge 69 surrounds the edge of the cover on at least three sides. Thus, whether the cover 56 is mounted horizontally or vertically, the ridge 69 serves as an umbrella to shed water away from the lid edge.

Again, an important feature of the present invention is the fact that the adapter plate 12, 14 is held in place by the gasket 46 and stays aligned via the projection(s) 16 through the gasket and via the receptacle or switch itself. Specifically, as shown in FIG. 14, the adapter plate 12, 14 abuts the back of the inner wall flange portion 80 of the cover base 60. As such, it does not fit or extend into the opening 64 in the base 60. In this manner, removal of the external cover 56 would leave the adapter plate 12, 14 behind.

As a result of the present invention, an electrical device cover is provided that can accommodate multiple types of electrical devices, such as a duplex receptacles, GFCI receptacles, switches and round receptacles of varying sizes. Moreover, the cover can be installed in either a vertical or a horizontal orientation, wherein water resistance is maintained in either orientation. The adapter plate locates in the holes of the electrical fixture and is held in place by holes in the gasket. Thus, the adapter plate is not held, positioned, or mechanically retained by the opening in the cover, nor does the adapter plate extend through the opening of the cover.

Although the illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

Figures 16, 16A, 16B:
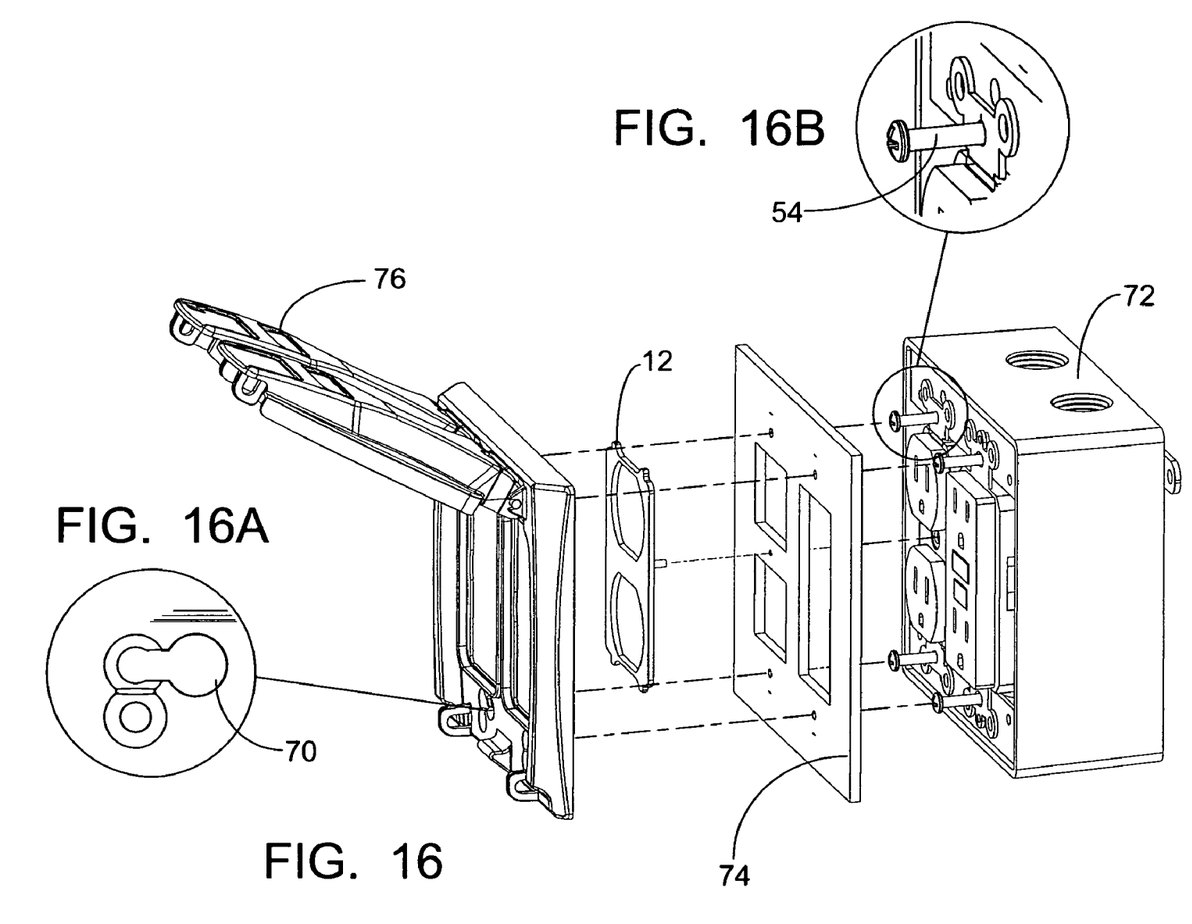
FIG. 16 is a top perspective view of an alternative embodiment of the cover assembly of the present invention in the form of a 2-gang cover.
FIG. 16A is an enlarged view of the keyhole opening in the cover shown in FIG. 16.
FIG. 16B is an enlarged view of the mounting screw shown in FIG. 15.

For example, it is envisioned that the present invention can be adapted to multiple receptacle boxes, such as the 2-gang box 72, shown in FIG. 16. In this embodiment, a modified gasket 74 and a modified cover 76 are provided to accommodate multiple fixtures. Multiple adapter plates 12 can be utilized or the adapter plate too can be modified to accommodate multiple fixtures.

What is claimed is:

1. A water-resistant cover assembly for an electrical outlet box having an open side and an electrical fixture contained therein, the electrical fixture including an aperture and a mounting screw for attaching the fixture to the outlet box, the cover assembly comprising:

a gasket sized to substantially cover the open side of the electrical outlet box;

an adapter plate having an opening sized and shaped to receive a portion of the electrical fixture therein, said adaptor plate further including at least one projection extending from a back face thereof, said projection piercing through said gasket to be frictionally held thereto and having a size adapted to be received in the aperture of the electrical fixture for aligning said adapter plate and said gasket thereto; and a cover adapted to engage the mounting screw of the electrical fixture for mounting said cover to the outlet box, said cover having an opening for providing access to the electrical fixture and being adapted to sandwich said adapter plate and said gasket against the electrical fixture when mounted to the outlet box.

2. A cover assembly as defined in claim 1, wherein said adapter plate is not attached to the electrical fixture.

3. A cover assembly as defined in claim 1, wherein said gasket includes a perforation for allowing a portion of said gasket to be removed, thereby forming an opening, said opening being sized and shaped to receive the portion of the electrical fixture therein.

4. A cover assembly as defined in claim 3, wherein said gasket includes two duplex perforations which are sized to form openings to receive two outlets of a duplex receptacle, a centrally disposed rectangular toggle switch perforation which is sized to form an opening to receive a lever of a toggle switch and at least one circular perforation which is sized to form an opening to receive a circular outlet of a round receptacle.

5. A cover assembly as defined in claim 1, wherein said gasket includes a projection aperture located to match the location of said adapter plate projection, said projection aperture frictionally engaging said adapter plate projection.

6. A cover assembly as defined in claim 1, wherein said gasket includes a receptacle mounting screw aperture located to match the location of the mounting screw of the electrical fixture, said receptacle mounting screw aperture gripping the mounting screw and forming a water-tight seal thereat.

7. A cover assembly as defined in claim 1, wherein said adapter plate is defined by an outer periphery and said opening in said cover is defined by an inner periphery, said inner periphery of said opening being smaller than said outer periphery of said adapter plate.

8. A cover assembly as defined in claim 1, wherein said adapter plate includes an outwardly extending ear provided on a peripheral edge thereof, and wherein said opening of said cover is defined by an edge perimeter surface, said edge perimeter surface of said cover engaging said outwardly extending ear to sandwich said adapter plate against the electrical fixture.

9. A kit for enclosing an electrical outlet box having an open side, the kit comprising:
   a universal gasket sized to substantially cover the open side of the electrical outlet box;
   a first adapter plate having an outer peripheral edge region and two receptacle openings sized and shaped to receive outlets of a duplex receptacle therein, said first adapter plate further including a projection extending from a back face thereof, said projection having a size adapted to pierce through said gasket to be frictionally held thereto and be received in an aperture of the duplex receptacle for aligning said adapter plate thereto;
   a second adapter plate having an outer peripheral edge region and an opening sized and shaped to receive a portion of at least one of a toggle switch and a round receptacle therein, said second adapter plate further including at least one projection extending from a back face thereof, said projection having a size adapted to pierce through said gasket to be frictionally held thereto and be received in an aperture of one of the toggle switch and round receptacle for aligning said adapter plate thereto; and
   a cover sized to substantially surround the electrical fixture mounted to the outlet box, said cover having an opening defined by an inner peripheral edge surface, said inner peripheral edge surface of said cover being adapted to abut the outer peripheral edge region of a selected one of said first and second adapter plates to sandwich said selected adapter plate against one of the duplex receptacle, the toggle switch or the round receptacle contained within the electrical outlet box.

10. A kit as defined in claim 9, wherein said gasket includes a perforation for allowing a portion of said gasket to be removed, thereby forming an opening, said opening being sized and shaped to receive the portion of the electrical fixture therein.

11. A kit as defined in claim 10, wherein said gasket includes two duplex perforations which are sized to form openings to receive two outlets of a duplex receptacle, a centrally disposed rectangular toggle switch perforation which is sized to form an opening to receive a lever of a toggle switch and at least one circular perforation which is sized to form an opening to receive a circular outlet of a round receptacle.

12. A kit as defined in claim 9, wherein said gasket includes a projection aperture located to match the location of said adapter plate projection, said projection aperture frictionally engaging said adapter plate projection.

13. A kit as defined in claim 9, wherein said gasket includes a receptacle mounting screw aperture located to match the location of the mounting screw of the electrical fixture, said receptacle mounting screw aperture gripping the mounting screw and forming a water-tight seal thereat.

14. A kit as defined in claim 9, wherein said outer peripheral edge region of said first and second adapter plates includes an outwardly extending ear, said inner peripheral edge surface of said cover being adapted to engage said outwardly extending ear to sandwich said selected adapter plate.

15. A kit as defined in claim 9, wherein said first adapter plate includes a single, centrally disposed projection adapted to be received in a centrally disposed aperture of the duplex receptacle.

16. A kit as defined in claim 9, wherein said second adapter plate includes a centrally disposed rectangular opening formed therein and adapted to receive a toggle member of a toggle switch therethrough.

17. A kit as defined in claim 16, wherein said second adapter plate further includes a circular, discontinuous slot formed therethrough around said rectangular opening, said discontinuous slot permitting a circular portion of said adapter plate to be frangibly removed to form a circular opening in said second adapter plate adapted to receive a circular outlet of a round receptacle.

18. A kit as defined in claim 9, wherein said second adapter plate includes two projections extending from said back face thereof, said projections being disposed at opposite longitudinal ends of said second adapter plate.

19. A water-resistant electrical outlet box assembly comprising:
   an electrical outlet box having an open side;
   an electrical fixture contained within said electrical outlet box, said electrical fixture including an aperture and a mounting screw for attaching said fixture to said outlet box;
   a universal gasket substantially covering said open side of said electrical outlet box;
   an adapter plate having an opening, said opening receiving a portion of said electrical fixture therein, said adaptor plate further including a projection extending from a back face thereof, said projection piercing through said gasket to be frictionally held thereto and being received in said aperture of said electrical fixture for aligning said adapter plate and said gasket thereto; and
   a cover mounted to said electrical outlet box, said cover engaging said mounting screw of said electrical fixture and having an opening for providing access to said electrical fixture, wherein said cover sandwiches said adapter plate and said gasket against said electrical fixture.

20. An electrical outlet box assembly as defined in claim 19, wherein said adapter plate is not attached to said electrical fixture.

21. A method for covering an electrical fixture within an electrical outlet box having the electrical fixture contained therein, the method comprising the steps of:
   inserting a projection formed on a back face of an adaptor plate through a gasket whereby said adaptor plate is frictionally held to said gasket, said adapter plate having an opening adapted to receive a portion of the electrical fixture therethrough;

aligning said adaptor plate and said gasket to the electrical fixture by inserting said projection in an aperture provided in the electrical fixture; and mounting a cover to the outlet box, said cover having an opening defined by an inner peripheral edge surface, said inner peripheral edge surface engaging an outer peripheral edge of said adapter plate, wherein said adaptor plate and said gasket are sandwiched between said cover and the electrical fixture.

22. A method as defined in claim 21, wherein said adaptor plate is not attached to said electrical fixture.

23. A method as defined in claim 21, further comprising the step of selecting said adapter plate from a plurality of adapter plates based on the type of electrical fixture contained in the electrical outlet box.

24. A method as defined in claim 21, further comprising the step of removing a portion of said adapter plate to create said opening to receive the portion of the electrical fixture therein.

25. A method as defined in claim 21, further comprising the step of removing a portion of said gasket to create an opening to receive the portion of the electrical fixture therein.

* * * * *